Jan. 3, 1928.
J. R. JONES
1,654,687
BUMPER BRACKET FOR AUTOMOBILES
Filed April 6, 1926
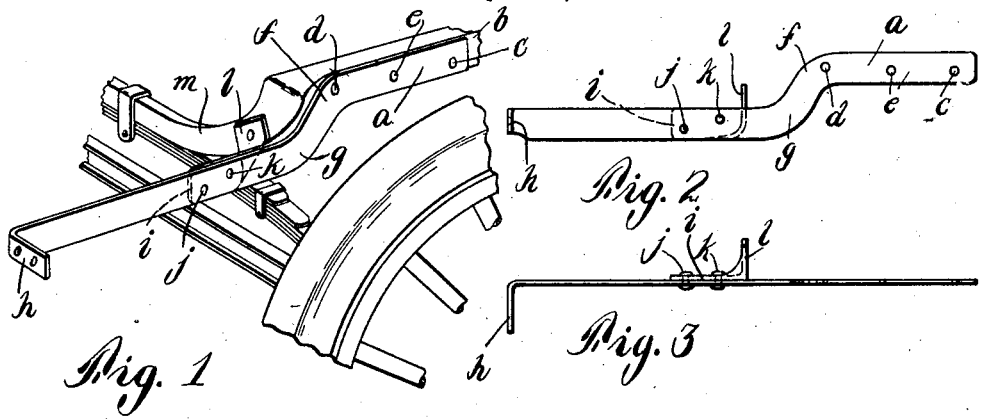
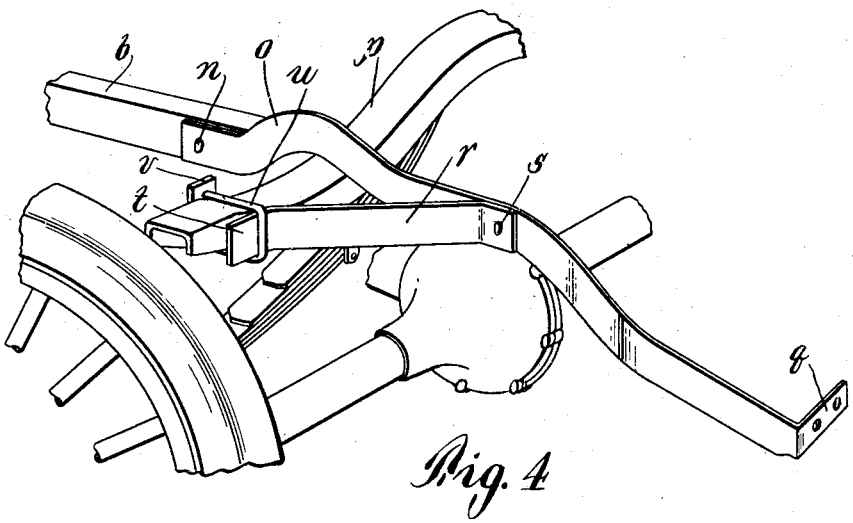
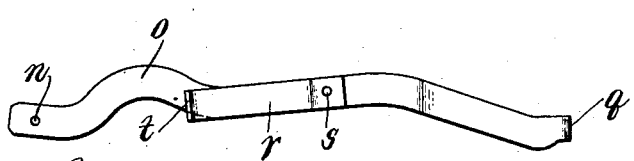
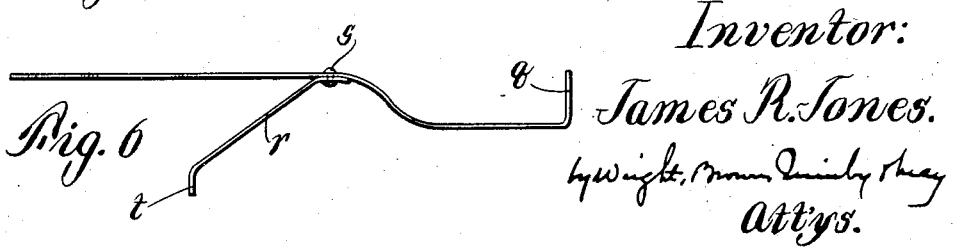
Inventor:
James R. Jones.
by Wright, Brown, Quinby & Macy
Att'ys.

Patented Jan. 3, 1928.

1,654,687

UNITED STATES PATENT OFFICE.

JAMES R. JONES, OF UTICA, NEW YORK, ASSIGNOR TO THE BOSSERT CORPORATION, OF UTICA, NEW YORK, A CORPORATION OF NEW YORK.

BUMPER BRACKET FOR AUTOMOBILES.

Application filed April 6, 1926. Serial No. 100,026.

This invention is concerned with supports or brackets intended and adapted to hold a bumper on an automobile; the specific design of such bracket herein illustrated being intended for application to the Ford automobile. The principles of the invention, with minor variations in detail, are applicable to brackets for both the forward and rear bumpers of the automobile; and in the drawings provided herewith for illustration, I have shown forms of the invention adapted to these two specific uses.

In the drawings,—

Fig. 1 is a fragmentary perspective view showing the lefthand part of the front end of a Ford automobile with the lefthand one of the front bumper brackets embodying this invention applied thereto;

Fig. 2 is a side elevation of said front bracket;

Fig. 3 is a plan view of the same;

Fig. 4 is a fragmentary perspective view showing the lefthand part of the rear end of an automobile having the lefthand rear bumper bracket embodying this invention secured thereto;

Fig. 5 is a side elevation of the rear bracket shown on a slightly smaller scale;

Fig. 6 is a plan view of the same.

Describing first the front bracket shown in Figs. 1, 2 and 3, the said bracket is formed as a bar of suitable material, preferably rolled steel, having sufficient width and thickness to give it adequate strength and stiffness, but preferably substantially greater in width than in thickness. I prefer to make the bar approximately two inches in width and five-sixteenths of an inch in thickness, although variations from these dimensions are permissible within suitable limits. The part $a$ of the bar is adapted to lie against the outer side of the side rail $b$ of the automobile chassis, and is pierced with holes $c$ and $d$ to receive bolts which pass through holes provided for their reception in the side rail. The lefthand bracket, which is the one shown here, has an additional hole $e$ to receive the steering column bolt of the car. At $f$ the bar is curved and bent downward, and at $g$ it is again curved and bent forward, being substantially straight from the bend $g$ to the outer end, where it is bent sharply outward to provide a lug $h$. Said lug is adapted to receive the bumper and is pierced with holes for the bumper-attaching bolts. It will be noted that the bends at $f$ and $g$, and the part of the bar which is comprised between these bends, form a downward offset, the length of which is such as to bring the bumper at the proper height above the ground, and the inclination of which is such as to afford stiffness against bending when the bumper strikes an obstruction.

A brace $i$ is secured to the bar $a$ by bolts $j$ and $k$, at a point between its outer end and the offset, and terminates in a lateral lug $l$, which is inclined so as to abut against the forward side of the forward cross member $m$ of the automobile chassis. The brace provides means for transmitting shocks from the bumper directly to the chassis and relieves the bolts at $d$ and $c$ of a large proportion of the shearing stress which would otherwise be applied to them. It also relieves the offset or bent part of the bar of the bending stresses, or a large proportion of them, due to the same shocks.

The right hand bracket is the reversed counterpart of the one above described; that is, it is reversed as to the direction in which the end lug is bent and the side to which the brace is applied. As to the direction and character of the intermediate offset, it is substantially identical with the lefthand bracket.

The rear brackets are, preferably, made of the same sort of stock, of substantially the same dimensions or proportions, as the front brackets, although here, also, variation is permissible. Describing in detail the lefthand rear bracket shown in these drawings, it is adapted to be laid at one end against the outer side of the chassis side rail $b$, to which it is secured by a bolt $n$. It is offset upwardly on a curve at $o$ so as to clear the rear cross member $p$ of the chassis, and also to provide an abutment which is adapted to engage the bottom of the car body, and thereby eliminate up and down movement of the bracket. From the bend $o$, the bracket is extended to the rear and downwardly, so as to bring its end at the proper height above the ground, and it is also bent outwardly to clear the spare tire. Its end is turned inward to form a lug $q$ pierced with holes, for attachment of the rear bumper.

A brace $r$ is applied and bolted at $s$ to the outer side of the bracket proper, between the outer end thereof and the offset at $o$, and extends thence on an inclination to the rear cross member *p*, against which it bears. The end of the brace *r* next to the cross member is bent outward, forming a lug *t* which is embraced and clamped to the cross member by a U-bolt *u* and a clip *v*. This brace not only absorbs shocks delivered when the bumper encounters an obstruction, thus guarding the bolt *n* against being sheared, and the offset *o* against being further bent or buckled, but also stiffens the bracket against side shocks and assists in preventing up and down movement of the rear end thereof.

The right hand bracket is the reversed counterpart of the lefthand one here described, as to all particulars, except the directions of its up and down bends or offsets which are in the same direction.

What I claim and desire to secure by Letters Patent is:—

1. A bumper bracket for automobiles comprising a wide, flat bar adapted to be attached flatwise to and against the side rail of the automobile chassis near one end of the latter and projecting beyond such end, and a brace secured to the side of said bar between its ends and adapted to abut against an adjacent cross member of the chassis; the bar being in the same plane with the side of the rail to which it is attached between its points of attachment to the rail and to the brace.

2. An automobile bumper bracket consisting of a bar adapted to be laid against the side rail of an automobile chassis adjacent one end thereof and to project beyond said end of the side rail, said bar being offset upwardly from the end which is thus attached to the chassis to provide a point of bracing contact with the bottom of the automobile body, and thence offset downwardly.

3. An automobile bumper bracket consisting of a bar adapted to be laid against the side rail of an automobile chassis adjacent one end thereof and to project beyond said end of the side rail, said bar being offset upwardly from the end which is thus attached to the chassis for engagement with the bottom of the automobile body, and thence offset downwardly and bent over at its outer end to provide a lug for attachment of the bumper.

4. An automobile bumper bracket consisting of a wide, flat bar adapted to be laid flatwise against the side rail of an automobile chassis adjacent one end thereof and to project beyond said end of the side rail, said bar having a hole for reception of an attaching bolt, the part of the bar which extends beyond the side rail being offset downwardly, and a brace secured to said bar between its ends and projecting laterally therefrom in position to abut against an adjacent cross member of the chassis; the part of the bar between its points of attachment to the rail and the brace being in one plane.

5. An automobile bumper bracket consisting of a bar adapted to be laid against the side rail of an automobile chassis adjacent one end thereof and to project beyond said end of the side rail, said bar being offset upwardly from the end which is thus attached to the chassis for engagement with the bottom of the automobile body, and thence offset downwardly, and a brace attached to the side of said bar between its ends and thence extending to abut against an adjacent cross member of the chassis.

6. An automobile bumper bracket consisting of a bar adapted to be laid against the side rail of an automobile chassis adjacent one end thereof and to project beyond said end of the side rail, said bar being offset upwardly from the end which is thus attached to the chassis for engagement with the bottom of the automobile body, a brace attached to the side of said bar between its ends and thence extending to abut against an adjacent cross member of the chassis, and means for securing said brace to said cross member.

In testimony whereof I have affixed my signature.

JAMES R. JONES.